United States Patent
Kanno et al.

(10) Patent No.: US 10,655,531 B2
(45) Date of Patent: May 19, 2020

(54) CYLINDER HEAD OF ENGINE

(71) Applicant: Mazda Motor Corporation, Aki-gun, Hiroshima (JP)

(72) Inventors: Takayoshi Kanno, Hiroshima (JP); Tadashi Tadokoro, Higashihiroshima (JP); Toshiki Otachi, Hatsukaichi (JP)

(73) Assignee: Mazda Motor Corporation, Aki-gun, Hiroshima (JP)

(*) Notice: Subject to any disclaimer, the term of this patent is extended or adjusted under 35 U.S.C. 154(b) by 0 days.

(21) Appl. No.: 16/250,163

(22) Filed: Jan. 17, 2019

(65) Prior Publication Data
US 2019/0226388 A1 Jul. 25, 2019

(30) Foreign Application Priority Data
Jan. 24, 2018 (JP) .................. 2018-009845

(51) Int. Cl.
*F02B 31/04* (2006.01)
*F02F 1/42* (2006.01)
*F02B 23/10* (2006.01)

(52) U.S. Cl.
CPC .............. *F02B 31/04* (2013.01); *F02B 23/10* (2013.01); *F02F 1/4214* (2013.01);
(Continued)

(58) Field of Classification Search
CPC .... F02B 31/04; F02B 23/10; F02B 2023/106; F02B 2023/108; F02B 2031/006; F02F 1/42; F02F 1/4228; F02F 1/4235
See application file for complete search history.

(56) References Cited

U.S. PATENT DOCUMENTS 4,706,623 A * 11/1987 Gadefelt ................. F02B 23/08
123/193.5
5,394,845 A * 3/1995 Noh ........................ F02B 31/00
123/308
(Continued)

FOREIGN PATENT DOCUMENTS

CN 205013138 U 2/2016
EP 0814245 A1 12/1997
(Continued)

OTHER PUBLICATIONS

European Patent Office, Extended European Search Report Issued in Application No. 19152198.8, dated May 27, 2019, Germany, 7 pages.

*Primary Examiner* — Thomas N Moulis
(74) *Attorney, Agent, or Firm* — Alleman Hall Creasman & Tuttle LLP (57) ABSTRACT

A cylinder head of an engine is provided, which includes first and second intake ports that open to a common cylinder. The first intake port opens to the cylinder to generate a swirl flow. The second intake port has a tumble flow generating part configured to cause intake air to become a tumble flow in the same direction as the swirl flow. The tumble flow generating part includes a helical part having an inner wall surface curving on a centerline perpendicular to an opening surface of the second port and continuing from a first port side to the opening of the second intake port toward at an opposite side from the first port. The opening of the second intake port has an edge part having an opening angle with respect to the centerline of the second port, the opening angle being smaller at an upstream side of the swirl flow.

7 Claims, 7 Drawing Sheets

(52) U.S. Cl.
CPC .......... *F02F 1/4228* (2013.01); *F02F 1/4235* (2013.01); *F02B 2023/106* (2013.01); *F02B 2023/108* (2013.01)

(56) References Cited

U.S. PATENT DOCUMENTS

| | | | | |
|---|---|---|---|---|
| 5,479,889 | A * | 1/1996 | Sato | F02B 31/00 123/188.14 |
| 5,762,041 | A * | 6/1998 | Fraidl | F02F 1/4214 123/308 |
| 5,765,372 | A * | 6/1998 | Mitobe | F02B 27/008 60/301 |
| 5,765,525 | A * | 6/1998 | Ma | F02B 17/00 123/308 |
| 5,870,993 | A | 2/1999 | Stellet et al. | |
| 6,009,849 | A * | 1/2000 | Yamamoto | F02B 23/105 123/298 |
| 6,213,090 | B1 * | 4/2001 | Tamai | F02B 31/085 123/308 |
| 6,250,281 | B1 * | 6/2001 | Takii | F02F 1/4214 123/188.14 |
| 6,431,140 | B1 | 8/2002 | Nishimura et al. | |
| 6,705,261 | B2 * | 3/2004 | Haghgooie | F01L 9/04 123/90.1 |
| 7,707,989 | B2 * | 5/2010 | Andou | F02B 31/04 123/188.14 |
| 7,874,278 | B2 * | 1/2011 | Sato | F02B 31/02 123/308 |
| 7,878,172 | B2 * | 2/2011 | Fritz | F02B 31/082 123/306 |
| 8,622,044 | B2 * | 1/2014 | Magro | F02F 1/4235 123/306 |
| 9,657,633 | B2 * | 5/2017 | Rowells | F02B 31/08 |
| 9,719,410 | B2 * | 8/2017 | Han | F02B 31/00 |
| 2001/0006056 | A1 * | 7/2001 | Ichikawa | F02B 31/02 123/308 |
| 2001/0050070 | A1 * | 12/2001 | Xu | F02B 17/005 123/295 |
| 2010/0224166 | A1 * | 9/2010 | Kuzuyama | F02B 31/085 123/295 |
| 2017/0089255 | A1 * | 3/2017 | Freisinger | F02B 25/145 |
| 2017/0145949 | A1 * | 5/2017 | Sczomak | F02B 31/085 |
| 2018/0274455 | A1 * | 9/2018 | Kunitomi | F02D 13/0226 |
| 2019/0383207 | A1 * | 12/2019 | Nakahara | F01L 3/22 |

FOREIGN PATENT DOCUMENTS

| | | |
|---|---|---|
| EP | 2017454 A1 | 1/2009 |
| EP | 2940268 A1 | 4/2015 |
| JP | 2000064843 A | 2/2000 |
| JP | 2009019613 A | 1/2009 |

* cited by examiner

CYLINDER HEAD OF ENGINE

TECHNICAL FIELD

The present disclosure relates to a cylinder head of an engine, and particularly to an intake port structure of the cylinder head.

BACKGROUND OF THE DISCLOSURE

Generally, it is known that two intake ports are provided to an engine cylinder, where a tangential port is used as one of the intake ports, while a helical port is used as the other intake port.

JP2009-019613A discloses that a swirl flow can be generated in an engine cylinder by two intake ports being a tangential port and a helical port, and a cylindrical member is provided upstream of the tangential port, to give a rotational component to intake air which flows out of the port. By giving the rotational component to the intake air flowing out of the tangential port, turbulence is produced in the intake air flow near an inner circumferential surface of the cylinder to reduce heat dissipation from the cylinder wall surface.

Figure 1:
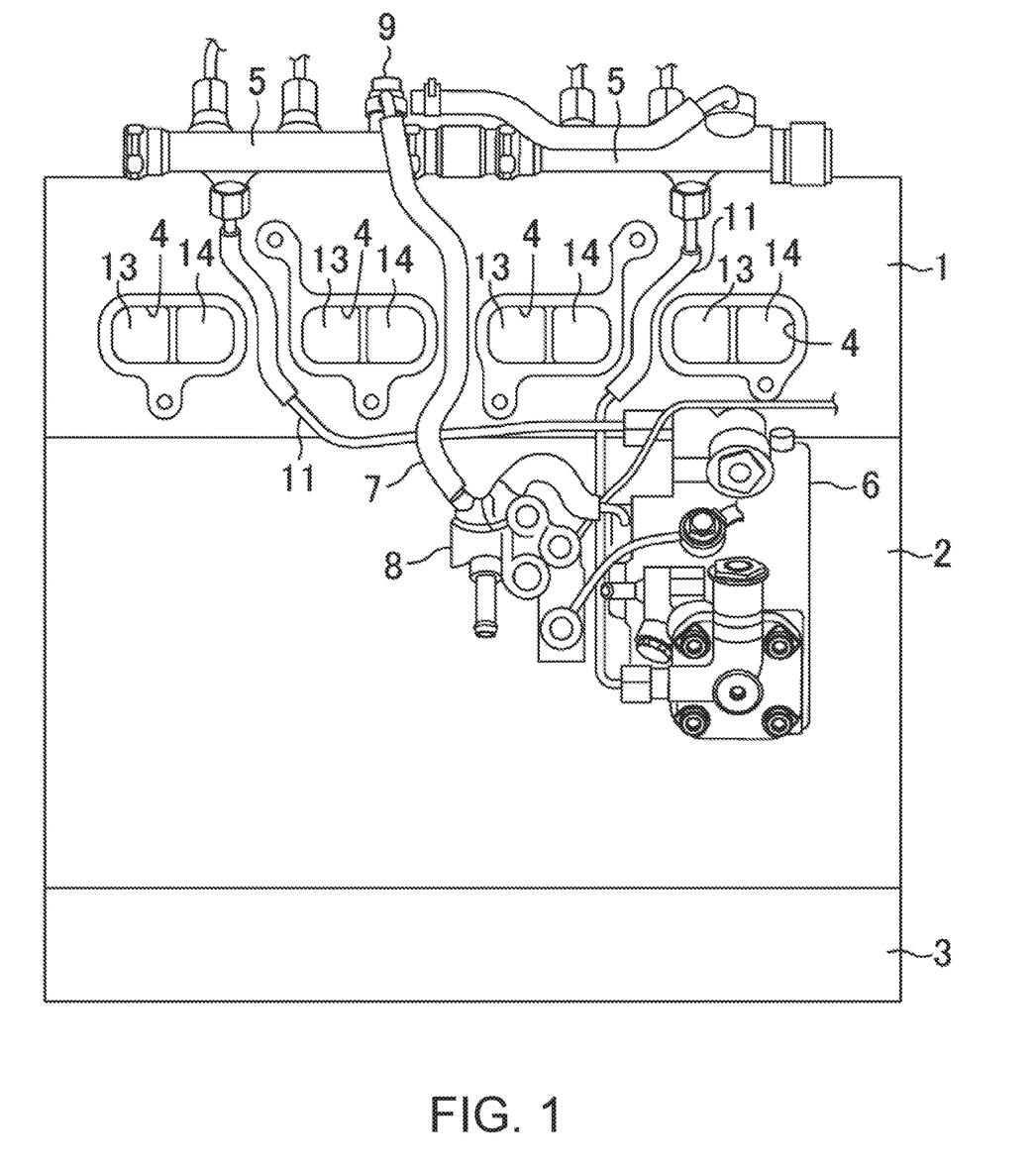
FIG. 1 is a front view of an engine.

JP2000-64843A discloses that an opening edge of an intake port which opens in a cylinder is chamfered into a conical surface, i.e., the opening of the intake port is gradually increased in the aperture diameter to be a tapered opening (FIG. 1).

When the swirl flow is generated inside the engine cylinder, it is advantageous in stimulating the mixing of fuel and intake air. Not only the shape of the intake port but the length of the intake port plays an important role for generating the swirl flow. That is, since an acceleration distance of the intake air flowing into the cylinder becomes longer as the length of the intake port increases, an increased flow velocity of the intake air and a stronger swirl flow can be generated with the extended length of the intake port.

However, the extension of the intake port may sometimes be difficult depending on the engine design. One such design is to extend the intake port to each cylinder by branching one common port which opens to a side surface of the cylinder head into two intake ports. In this case, the acceleration distance of the intake air becomes substantially shorter compared to intake ports that are completely independent from the side surface of the cylinder head to the cylinders. Since the flow passage cross-sectional area of the common port is large, it does not have a large effect of accelerating the intake air. Therefore, it is difficult to generate an expected, strong swirl flow in the cylinder.

For example, such a common port is provided in the following case. In this case, a common rail is provided to the cylinder head, a fuel pump is provided on the cylinder block side, and fuel piping which connects the fuel pump with the common rail is provided to the side surface of the cylinder head where the intake port opens. Here, a fuel-feed pipe and a fuel-return pipe need to pass through a space between openings of the adjacent intake ports. In addition, if the independent intake ports are adopted, it may be difficult to secure the space for the fuel piping because of the intake port openings. In order to solve this problem, two intake ports connected to the respective cylinders are joined to have one inlet to secure the piping space, which may be referred to as a "common port system." However, it is difficult in the common port system to generate the strong swirl flow because of its substantially short acceleration distance of the intake ports as described above.

SUMMARY OF THE DISCLOSURE

Therefore, the present disclosure aims at a generation of a strong swirl flow even with a short acceleration distance.

The present disclosure addresses the above issues by focusing on an opening angle of an opening edge of an intake port, which opens toward a cylinder.

According to one aspect of the present disclosure, a cylinder head of an engine is provided, which includes a first intake port and a second intake port, each having an opening that opens to a common cylinder. The first intake port opens to the cylinder to generate a swirl flow in which intake air circles in the cylinder around a cylinder axis. The second intake port has a tumble flow generating part configured to cause intake air to form a tumble flow in the same direction as the swirl flow and flow into the cylinder. The tumble flow generating part includes a helical part having an inner wall surface curving around a centerline perpendicular to an opening surface of the second intake port and continuing from a first intake port side to an opposite side from the first intake port at the opening of the second intake port. The second intake port has an edge part of the opening thereof, the edge part having an opening angle with respect to the centerline of the second intake port, the opening angle being smaller at an upstream side of the swirl flow than at a downstream side of the swirl flow.

According to this structure, by the setting of the opening angle, intake air is guided by the guide surface, and flows toward the bottom dead center of the cylinder, from the upstream side of the swirl flow of opening edge of the second intake port. Therefore, the swirl flow is prevented from being canceled out by the intake air which flows into the cylinder from the second intake port. Moreover, when the intake air flows as a tumble flow from the second intake port into the cylinder, by setting the opening angle of the guide surface, the intake air which flows into the cylinder from the second intake port circles directly below the opening. Therefore, the swirl flow caused by the first intake port is boosted by the tumble flow caused by the second intake port.

The second intake port may include a curved part, provided upstream of the helical part, curved to be convex in a direction away from the first intake port so that intake air is guided to flow toward the inner wall surface of the helical part on the first intake port side.

According to this structure, since the intake air which flows through the second intake port is guided toward the inner wall surface of the first intake port side of the helical part by the curved part, the tumble flow generation by the helical part is stimulated. Therefore, it is advantageous for generation of the strong swirl flow in the cylinder.

The edge part of the opening of the second intake port may be a second edge part and the opening angle of the second edge part may be a second opening angle. The first intake port may have a first edge part of the opening thereof, the first edge part having a first opening angle with respect to the centerline perpendicular to an opening surface of the first intake port, the first opening angle being larger at a side to which the intake air flows to generate the swirl flow than at a side across the opening of the first intake port.

According to this structure, the flow of the intake air which flows from the first intake port toward the downstream side of the swirl flow is boosted, which is advantageous for generation of the strong swirl flow.

The first intake port and the second intake port may be formed by branching one common port that opens to a side surface of the cylinder head into two parts, and extending to the cylinder.

In such a case where an acceleration distance of the intake air becomes shorter by branching the two intake ports from the common port, the boosting of the swirl flow by setting of the opening angle of the second intake port as described above is especially useful.

DETAILED DESCRIPTION OF THE DISCLOSURE

Hereinafter, one form for implementing the present disclosure is described based on the accompanying drawings. The following description of one embodiment is merely illustration, and is not intended to limit the present disclosure, and applications and usage thereof.

As illustrated in FIG. 1, an automobile is provided with an in-line multi-cylinder diesel engine, and this engine includes a cylinder head 1, a cylinder block 2, and a cylinder block lower casing 3. Four common ports 4, which introduce intake air respectively into four cylinders, open in a side surface of the cylinder head 1, so as to be separated from each other in the cylinder line-up directions. Two intake ports branch from each common port 4 and extend to the corresponding cylinder. Although illustration is omitted, a surge tank which communicates with the four common ports 4 is attached to the side surface of the cylinder head 1.

On the cylinder head 1, two common rails 5 extending in the cylinder line-up directions are disposed in series. One of the common rails 5 stores high-pressure fuel to be supplied to a fuel injection valve for each of two cylinders on one side, and the other common rail 5 stores high-pressure fuel to be supplied to a fuel injection valve for each of the two other cylinders. A fuel pump 6 which supplies fuel to the two common rails 5 is fixed to the side surface of the cylinder block 2.

A fuel-feed pipe 7 extends from the fuel pump 6 through a relay part 8 fixed to the side surface of the cylinder block 2 to a distribution part 9 provided to an end part of one common rail 5. The fuel is distributed to the two common rails 5 from the distribution part 9. A fuel-return pipe 11 extends from each of the two common rails 5 to the fuel pump 6.

The fuel-supply pipe 7 and the fuel-return pipes 11 are piped on the side surface of the cylinder head 1 so as to pass through locations corresponding to parts between the openings of the adjacent two common ports 4 in order to avoid the piping from becoming too long.

Here, the engine of this embodiment adopts an electric VVT (Variable Valve Timing mechanism) at an exhaust valve side. In this case, if a fuel pump with a large load is driven by an exhaust-side cam shaft which drives exhaust valves, the operation control of the VVT by an electric motor will become unstable. Therefore, this embodiment adopts a system in which the fuel pump 6 is driven by a crankshaft, separately from the exhaust-side cam shaft, i.e., without being driven by the exhaust-side cam shaft. Because of this structure, the fuel pump 6 is not disposed at the cylinder head 1 side, but disposed at the cylinder block 2 side.

In order to secure the piping space of the fuel-feed pipe 7 and the fuel-return pipes 11 on the side surface of the cylinder head 1, the two intake ports of each cylinder are formed by branching at the common port 4 which opens in the side surface of the cylinder head 1. In this common port system, the piping space is easy to be secured because it is not necessary to form an opening for each intake port in the side surface of the cylinder head 1.

<Two Intake Ports of Each Cylinder>

Figure 2:
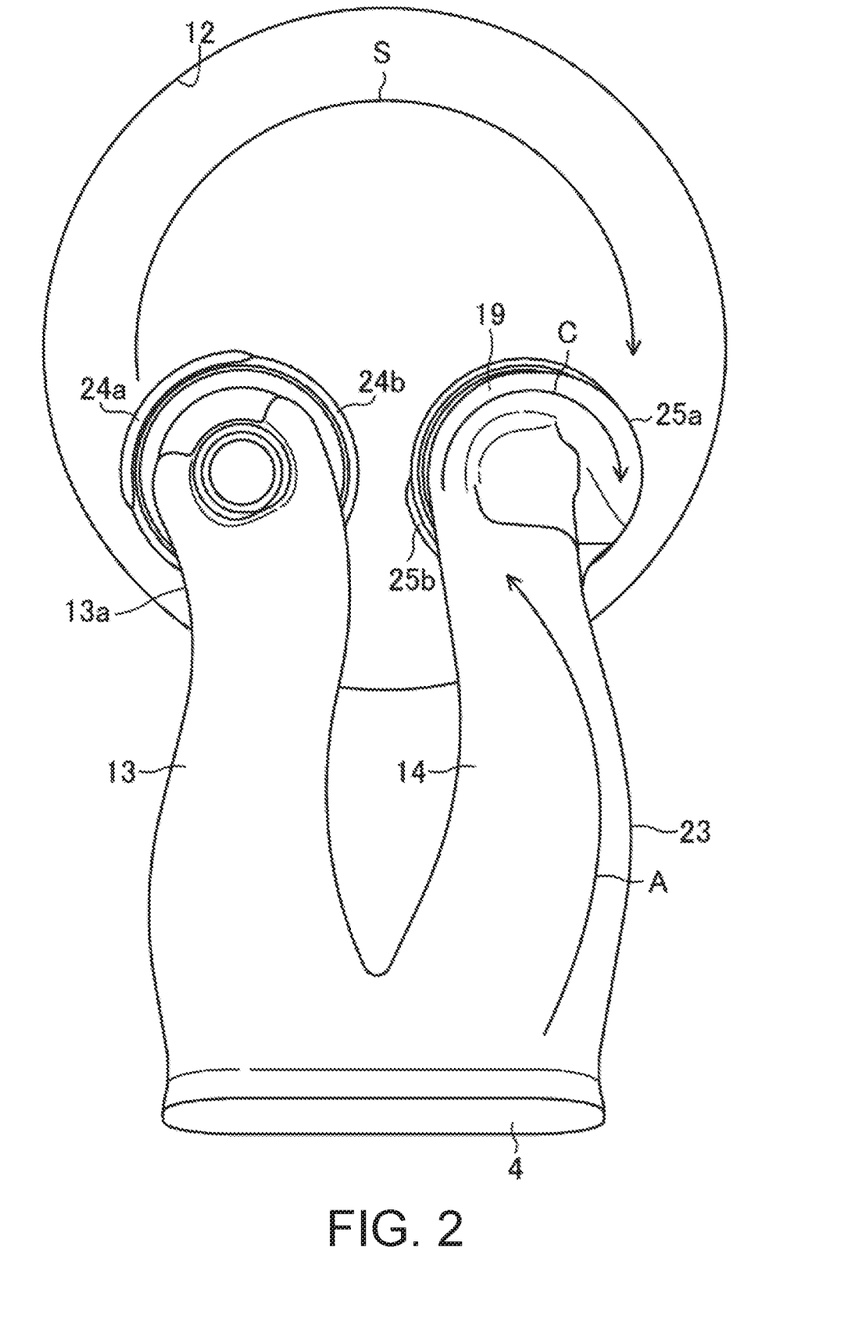
FIG. 2 is a plan view illustrating a structure of an intake port.
Figure 4:
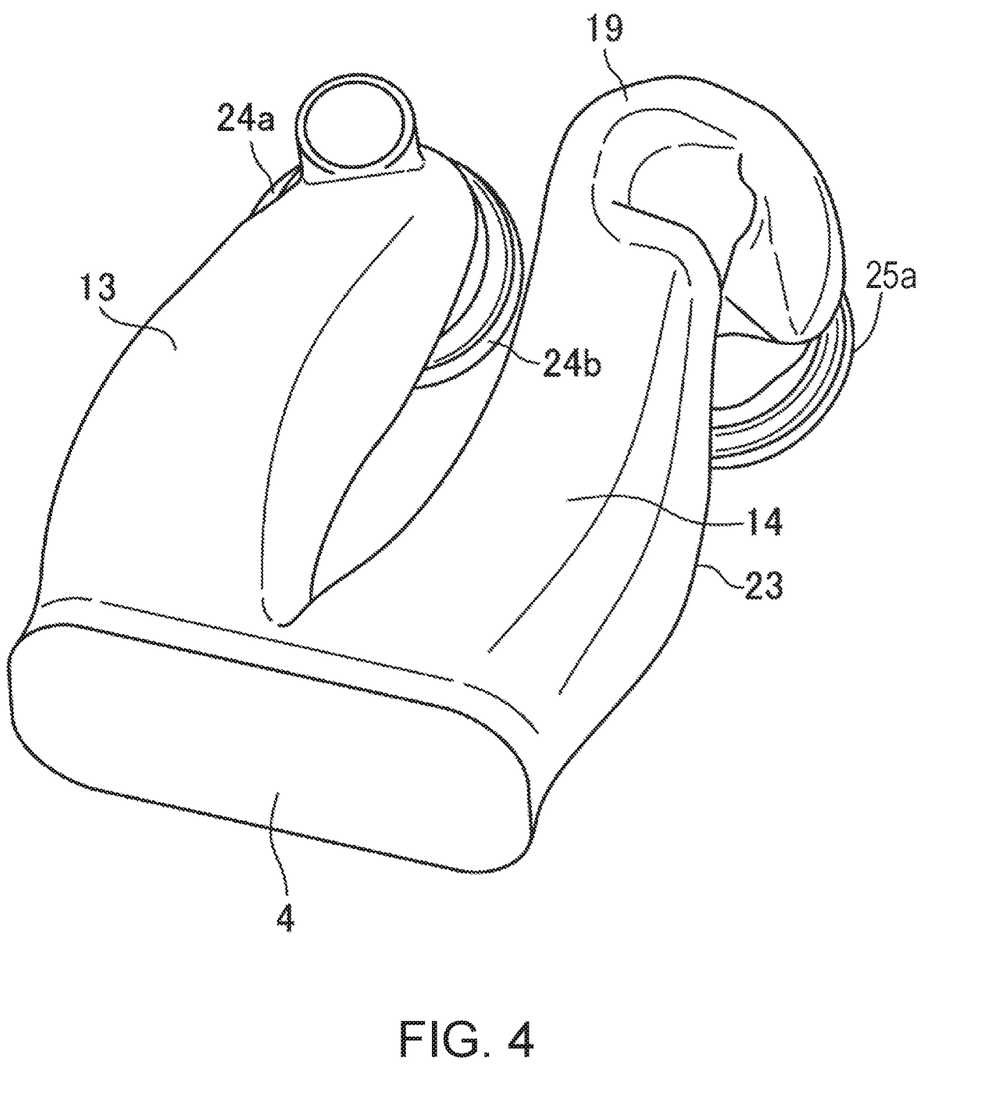
FIG. 4 is a perspective view illustrating the intake port structure.

As illustrated in FIG. 2, each cylinder 12 is provided with two intake ports of a first intake port 13 (may also be called a primary intake port) and a second intake port 14 (may also be called a secondary intake port), which are aligned in the cylinder line-up directions. In FIGS. 2 and 4, the shapes of the intake ports 13 and 14 are instead illustrated as the shape of a core corresponding to the intake ports, which is used when casting the cylinder head 1. The intake ports 13 and 14 branch in two ways from the common port 4 which opens in the side surface of the cylinder head 1, extend toward the cylinder 12, and open to the cylinder 12 from a lower surface of the cylinder head 1 (a surface which defines an engine combustion chamber with the cylinder 12).

Figure 3:
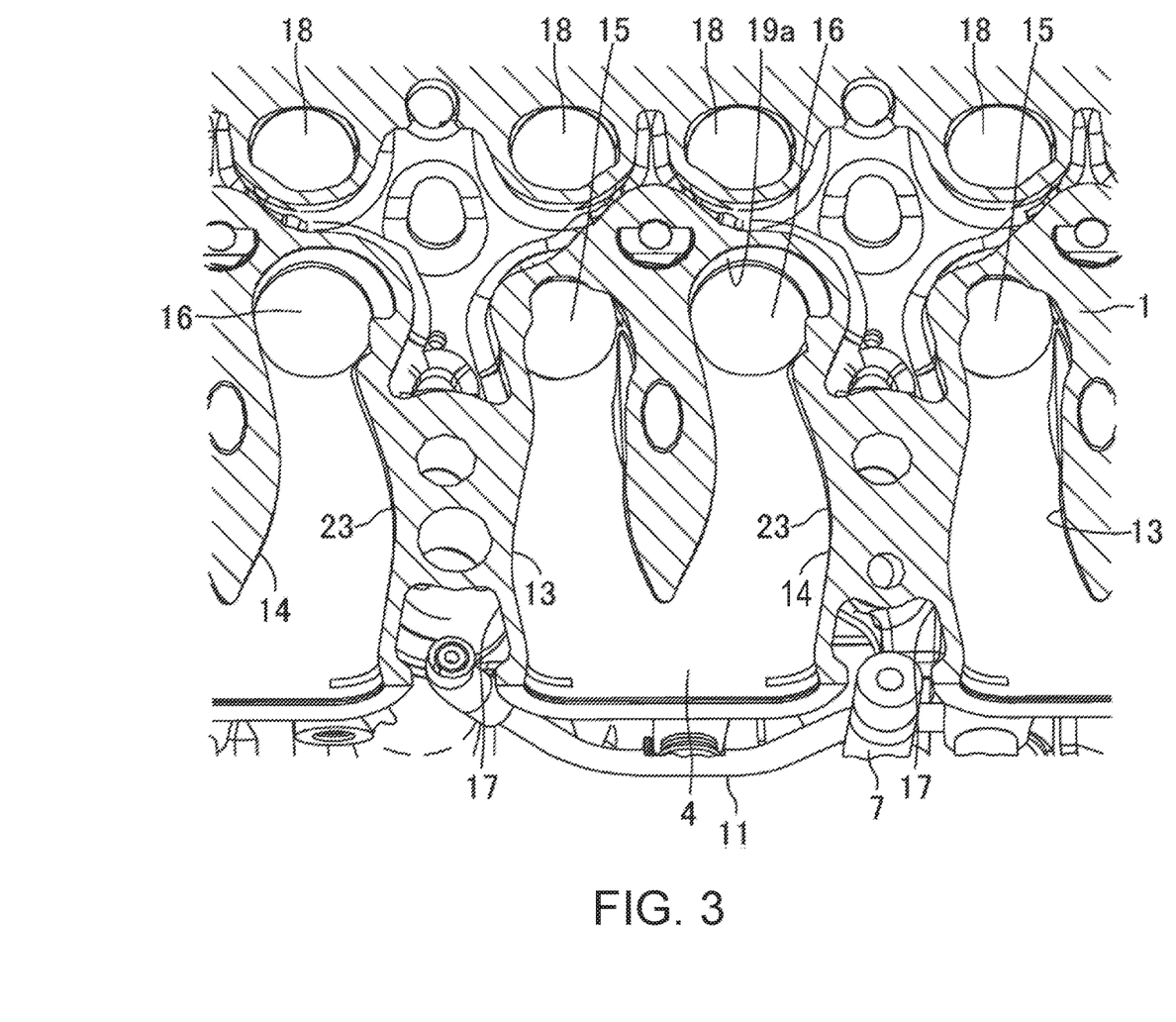
FIG. 3 is a transverse cross-sectional view of a cylinder head, illustrating the structure of the intake port.

As illustrated in FIG. 3, openings 15 and 16 of the intake ports 13 and 14 to the cylinder 12 (intake ports which open toward the cylinder 12) are aligned in the cylinder line-up directions. The fuel-feed pipe 7 and the fuel-return pipes 11 are accommodated in a recess 17 formed between the adjacent common ports 4 in the side surface of the cylinder head 1. In FIG. 3, openings 18 (exhaust ports) of the exhaust ports open toward the cylinders 12. Note that although the openings 15 and 16 of the intake ports 13 and 14 appear to be distorted in different ways in FIG. 3 due to the cut position of the cross section, they are circular like the openings 18 of the exhaust ports.

As illustrated in FIG. 2, the first intake port 13 opens to the cylinder 12 so that a swirl flow S in which intake air circles inside the cylinder 12 on the cylinder axis is generated. That is, the first intake port 13 is a tangential port formed so that intake air flows from the opening 15 into the cylinder 12 substantially in a tangential direction of an inner circumferential surface of the cylinder 12 (substantially in the tangential direction of the inner circumferential surface of the cylinder at the closest position to the opening 15). A downstream part 13*a* of the first intake port 13 toward the opening 15 is directed to the tangential direction of the inner circumferential surface of the cylinder 12.

Figure 5:
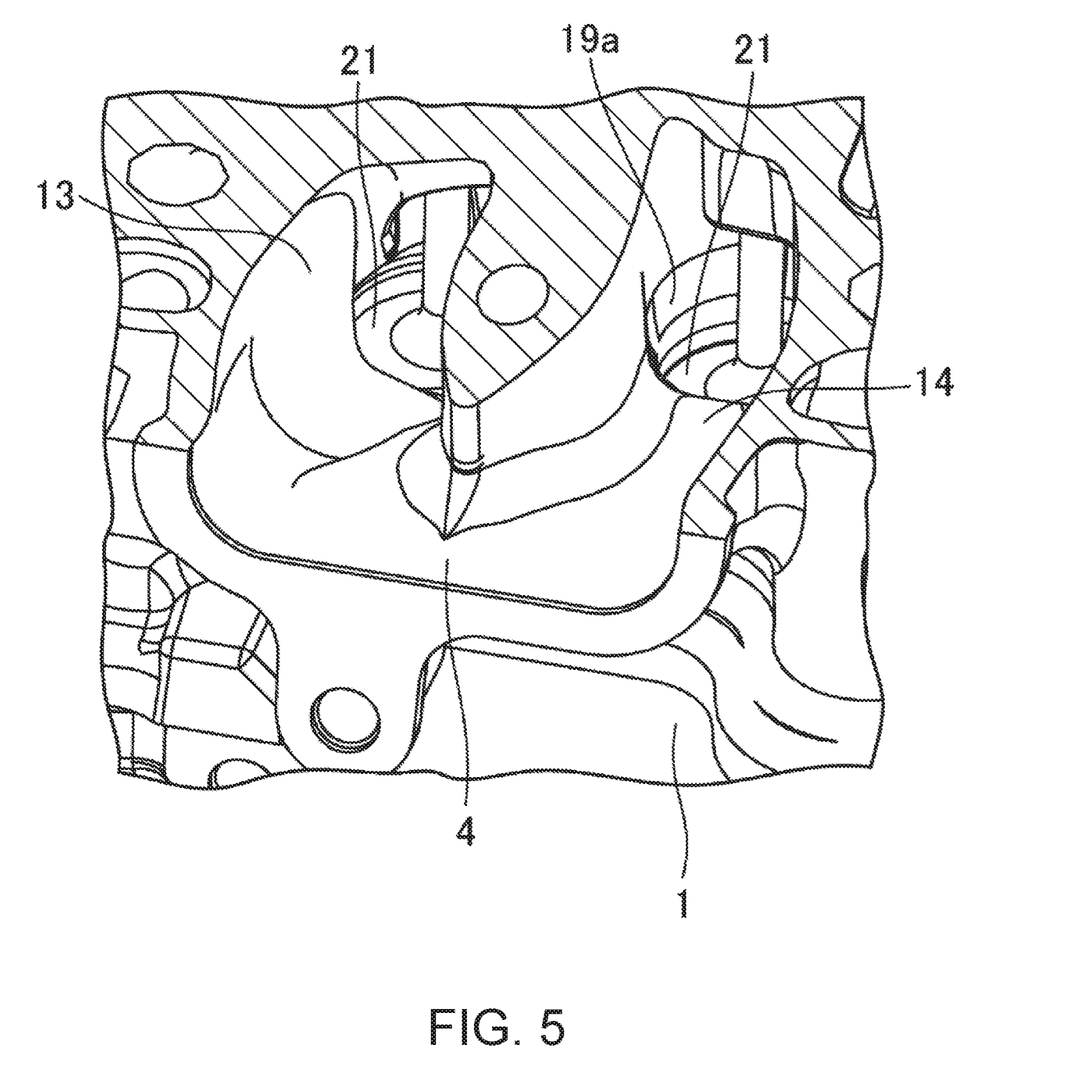
FIG. 5 is a perspective view illustrating the intake port structure, where the cylinder head is partially cut off.

The second intake port 14 is a helical port having a helical part 19 (tumble flow generating part) which causes intake air to flow into the cylinder 12 in the form of a tumble flow C which turns in the same direction as the swirl flow S. As illustrated in FIG. 3, the helical part 19 has an inner wall surface 19*a* which continues from the first intake port 13 side to the opposite side from the first intake port 13 at the opening 16, while curving around a centerline (an axial center of an intake valve 21 illustrated in FIGS. 5 and 6) perpendicular to an opening surface of the second intake port 14 to the cylinder 12.

As illustrated in FIG. 4, the helical part 19 is formed in a shape which circles around a portion where the intake valve 21 is provided. When intake air flows into the cylinder 12, the air is guided to be the tumble flow C by the inner circumferential surface 19a of the helical part 19. Thus, the intake air flows into the cylinder 12 after becoming the tumble flow C.

As illustrated in FIG. 2 and other figures, the second intake port 14 is provided with a curved part 23 upstream of the helical part 19. The curved part 23 curves so that it becomes convex in a direction away from the first intake port 13 to guide intake air toward the inner wall surface of the helical part 19 on the first intake port 13 side.

<Guide Surface of Intake Port Opening>

Figure 6:
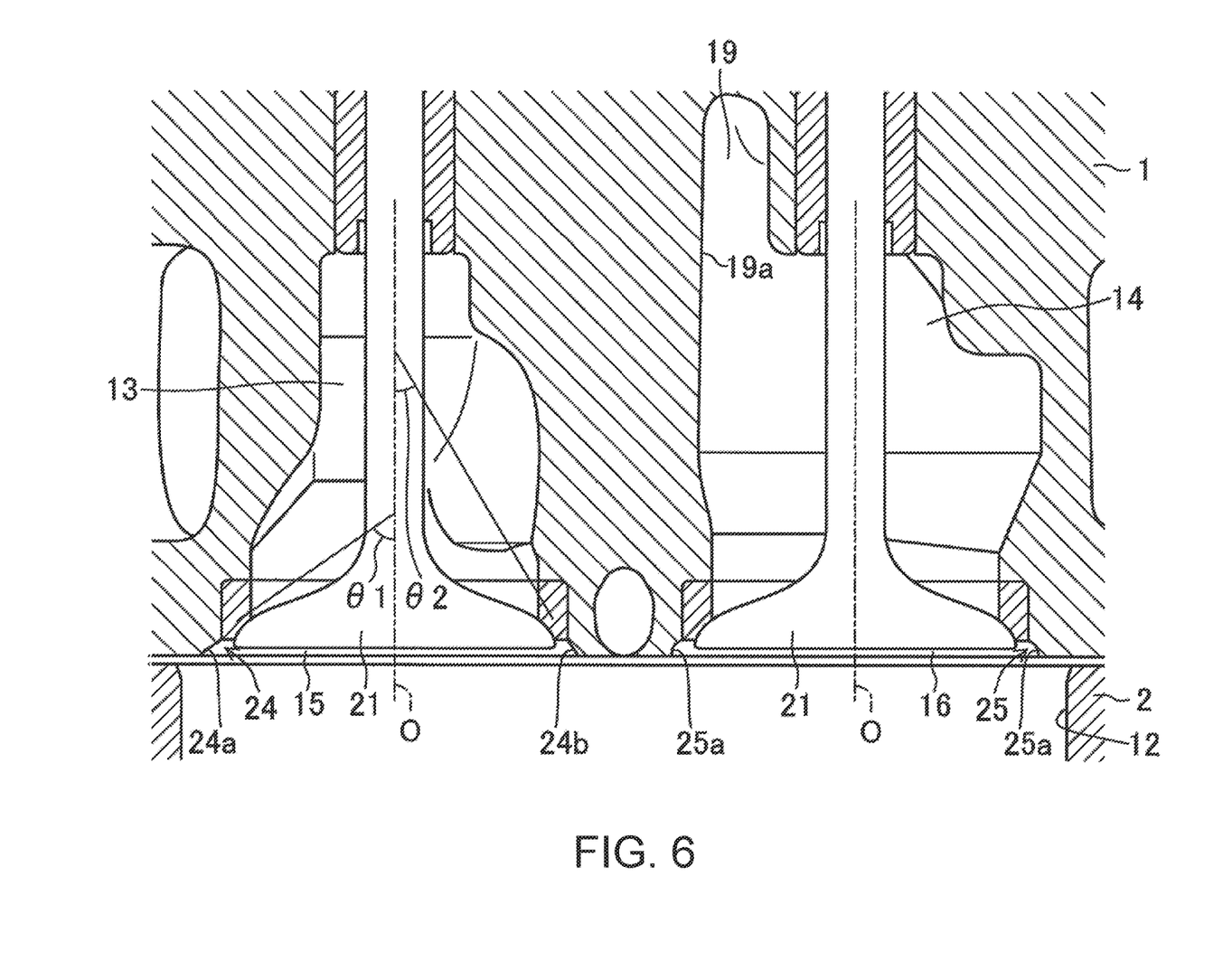
FIG. 6 is a longitudinal cross-sectional view illustrating the intake port structure.

As illustrated in FIG. 6, guide surfaces 24 and 25 are formed in circumferential edges of the openings 15 and 16 of the first intake port 13 and the second intake port 14, respectively. The guide surfaces 24 and 25 guide the intake air so as to control an inflow direction of the intake air into the cylinder 12. These guide surfaces 24 and 25 define opening angles with respect to centerlines O (the axial centers of the intake valves 21) perpendicular to the opening surfaces of the intake ports 13 and 14, respectively, to cause the intake air to flow into the cylinder 12 in expected directions. In FIG. 6, the intake valve 21 contacts a valve seat, and the guide surfaces 24 and 25 are provided on the cylinder 12 side of the valve seat. Below, the guide surfaces 24 and 25 are described in detail.

The guide surface 24 of a conical surface is formed in the circumferential edge of the opening 15 of the first intake port 13 so that the aperture gradually expands toward the cylinder 12. Note that the opening angle of the guide surface 24 is not the same or constant throughout the circumference of the opening 15, but is partially different considering the direction of the swirl flow.

Figure 7:
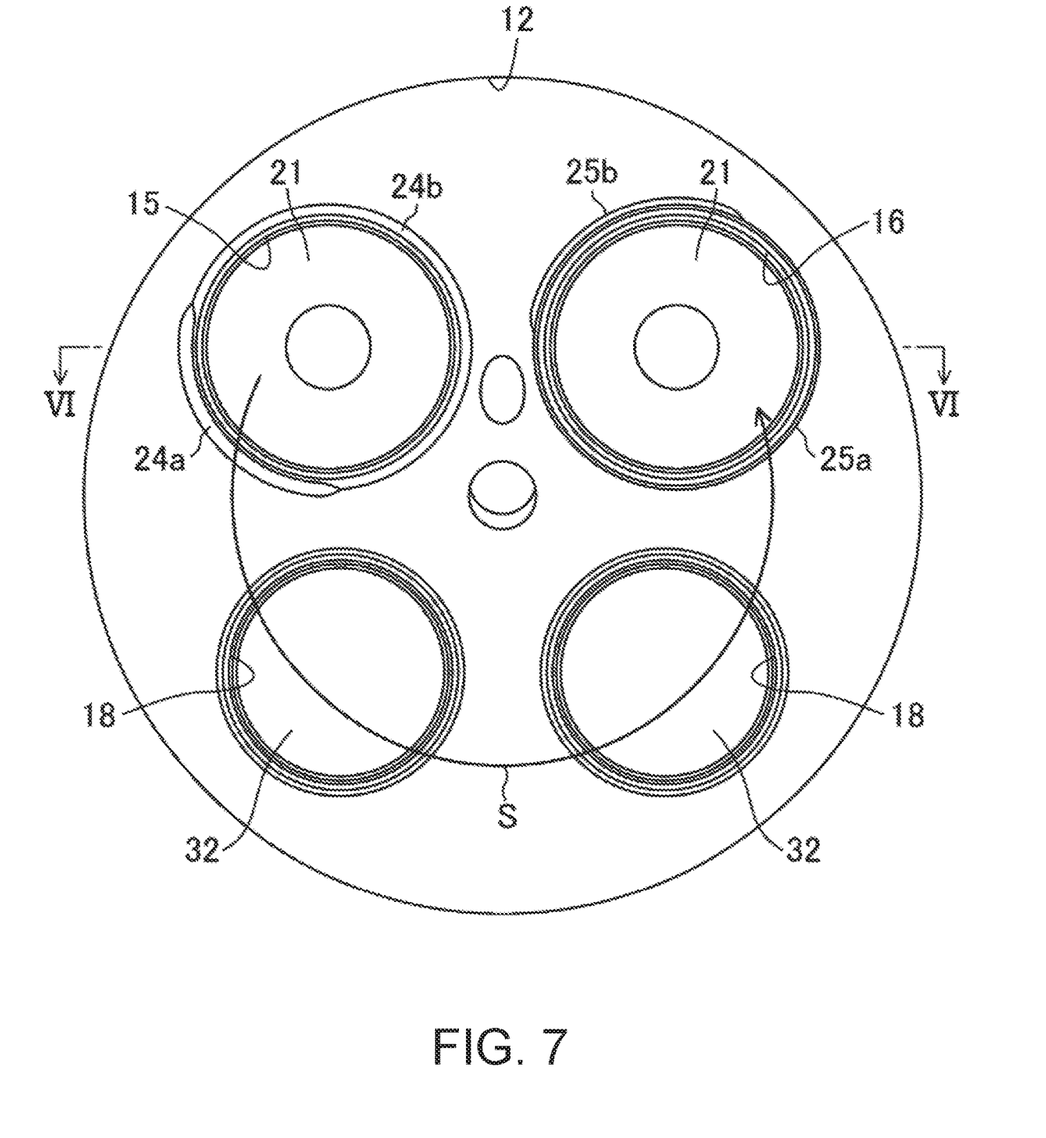
FIG. 7 is a bottom view of the cylinder head, viewed from the inside of the cylinder, illustrating an opening shape of the intake port.

In other words, as illustrated in FIG. 7, the first intake port 13 is provided with a guide surface 24a on the side (lower left side of the intake opening 15 in this figure) to which the intake air flows to generate the swirl flow S at the circumferential edge of the opening 15. The guide surface 24a has a different opening angle from a guide surface 24b located on the opposite side (upper and right side of the intake opening 15) across the opening 15 from the guide surface 24b. FIG. 6 is a cross-sectional view taken along a line VI-VI of FIG. 7, where an opening angle θ1 of the guide surface 24a on the side to which the intake air flows to generate the swirl flow S is larger than an opening angle θ2 of the guide surface 24b on the opposite side. Note that exhaust valves 32 are also illustrated in FIG. 7.

In this embodiment, the guide surface 24a of the larger opening angle θ1 is formed in a part of the circumferential edge of the opening 15 on the side to which the intake air flows to generate the swirl flow S, and the guide surface 24b of the relatively smaller opening angle θ2 is formed in the remaining part of the circumferential edge of the opening 15.

Without an intention of any limiting sense, the opening angle θ1 of the guide surface 24a may be, for example, within a range of 50° or more and 70° or less (50°≤θ1≤70°), and the opening angle θ2 of the guide surface 24b may be smaller than the opening angle θ1, for example, within a range of 35° or more and 55° or less (35°≤θ2≤55°). It may be more desirable that the opening angle θ1 of the guide surface 24a is within a range of 55° or more and 65° or less (55°≤θ1≤65°), and the opening angle θ2 of the guide surface 24b is within a range of 40° or more and 50° or less (40°≤θ2≤50°).

Moreover, a circumferential range where the guide surface 24a of the larger opening angle θ1 is formed is an angle range centering on the center of the opening 15, which may desirably be 30° or more and 60° or less, for example.

As illustrated in FIG. 7, on the other hand, the second intake port 14 is provided with a guide surface 25a of a different opening angle from a guide surface 25b. The guide surface 25a is located at the upstream side of the swirl flow S within the edge of the opening 16, whereas the guide surface 25b is located at the downstream side of the swirl flow S. In other words, the swirl flow S flows counterclockwise inside the cylinder 12 in the view shown in FIG. 7 and reaches the guide surface 25a before the guide surface 25b.

The opening angle of the guide surface 25b at the downstream side of the swirl flow S is about the same as the opening angle θ2 of the guide surface 24b of the first intake port 13. The opening angle of the guide surface 25b may desirably be within a range of 35° or more and 55° or less, and more desirably within a range of 40° or more and 50° or less, for example.

On the other hand, the opening angle of the guide surface 25a on the upstream side of the swirl flow S is smaller than the opening angle of the guide surface 25b on the opposite side (e.g., θ2) across the opening 16. The opening angle of the guide surface 25a may desirably be 20° or less and 0° or more, for example.

Moreover, a circumferential range where the guide surface 25a of the smaller opening angle is formed is an angle range centering on the center of the opening 16, which may desirably be 30° or more and 60° or less, for example.

In FIG. 6, illustrated is the guide surface 25a of the second intake port 14, which has the smaller opening angle, and the opening angle is 0° in this example.

<Operation and Effects of Intake Ports 13 and 14>

According to this embodiment, the intake air flowed from a surge tank through the common port 4 into the first intake port 13 flows at the downstream part 13a in the tangential direction of the inner circumferential surface of the cylinder 12, and then flows into the cylinder 12 from the opening 15. Thus, the intake air flows in the tangential direction of the inner circumferential surface of the cylinder and flows into the cylinder 12 to generate the swirl flow S in which the intake air circles around the cylinder axis inside the cylinder 12.

The guide surface 24a with the larger opening angle θ1 is formed in the edge of the opening 15 of the first intake port 13, on the side to which the intake air flows to generate the swirl flow S. Therefore, when the intake air flows into the cylinder 12, the air is guided by the guide surface 24a so that it becomes easy to flow in the tangential direction of the inner circumferential surface of the cylinder 12. Thus, it is advantageous for generation of the swirl flow S.

On the other hand, the intake air flowed into the second intake port 14 from the common port 4 is guided by the curved part 23, and as illustrated by the arrow A, the air flows toward the inner wall surface 19a of the helical part 19 on the first intake port 13 side. Then, the intake air flows to the opposite side of the first intake port 13 by being guided by the inner circumferential surface 19a to become the tumble flow in which the air circles around the centerline perpendicular to the opening surface of the second intake port 14 to the cylinder 12, and then flows into the cylinder 12. Since the intake air is guided by the curved part 23 to flow toward the inner wall surface 19a of the helical part 19 on the first intake port 13 side, it is advantageous for generation of the tumble flow by the helical part 19.

The guide surface 25a with the smaller opening angle is formed in the edge of the opening 16 of the second intake port 14, on the upstream side of the swirl flow S. In the example of FIG. 6, the opening angle is 0°. Thus, the intake air is guided to the guide surface 25a from the upstream side of the swirl flow S with respect to the opening 16, and then flows toward the bottom dead center of the cylinder 12. Therefore, the swirl flow S is prevented from being canceled by the intake air which flows into the cylinder 12 from the second intake port 14.

Moreover, as described above, since the intake air flows toward the bottom dead center of the cylinder 12 while being guided by the guide surface 25a, the intake air which flows into the cylinder 12 from the second intake port 14 circles directly below the opening 16. Therefore, the swirl flow S caused by the first intake port 13 is boosted by the tumble flow C caused by the second intake port 14.

In addition, the guide surface 25b of the edge of the opening 16 of the second intake port 14, at the downstream side of the swirl flow S has the larger opening angle than the guide surface 25a at the upstream side. Therefore, the intake air which flows into the cylinder 12 while being guided by the guide surface 25b located at the downstream side boosts the swirl flow S.

As described above, the swirl flow S generated in the cylinder 12 is boosted by the following: the guide surface 24a with the larger opening angle θ1 is provided in the edge of the opening 15 of the first intake port 13, on the side to which the intake air flows to generate the swirl flow S;

the curved part 23 is provided in the second intake port 14;

the guide surface 25a with the smaller opening angle is provided on the upstream side of the swirl flow S, of the edge of the opening 16 of the second intake port 14; and the guide surface 25b with the larger opening angle is provided at the downstream side of the swirl flow S, of the edge of the opening 16 of the second intake port 14.

Therefore, although the lengths of the intake ports 13 and 14 are shorter than the conventional independent intake ports without the common port 4, the intake ports of the present disclosure boost the swirl flow S by stimulating the mixture of intake air and fuel, thereby advantageously improving the engine output and fuel consumption.

Although the above embodiment is directed to the cylinder head of the in-line 4-cylinder engine, the present disclosure may also be applied to other engines, such as an in-line 6-cylinder engine, and a single cylinder engine, similarly to the above embodiment.

Moreover, although the intake ports of the above embodiment are ports branched from the common port, the present disclosure may also be applicable to the independent intake port without the common port, similarly to the above embodiment.

Furthermore, the engine of the above embodiment may also be a gasoline engine, without being limited to the diesel engine.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Cylinder Head
2 Cylinder Block
4 Common Port
5 Common Rail
6 Fuel Pump
7 Fuel-feed Pipe
11 Fuel-return Pipe
12 Cylinder
13 First Intake Port
14 Second Intake Port
15 Opening of First Intake Port
16 Opening of Second Intake Port
17 Helical Part (Tumble Flow Generating Part)
19a Inner Circumferential Surface
23 Curved Part
24 Guide Surface of First Intake Port
24a Guide Surface with Larger Opening Angle
24b Guide Surface with Smaller Opening Angle
25 Guide Surface of Second Intake Port
25a Guide Surface with Smaller Opening Angle
25b Guide Surface with Larger Opening Angle

What is claimed is:

1. A cylinder head of an engine, comprising:
a first intake port and a second intake port, each having an opening that opens to a common cylinder,
wherein the first intake port opens to the cylinder to generate a swirl flow in which intake air circles in the cylinder around a cylinder axis,
wherein the second intake port has a tumble flow generating part configured to cause intake air to form a tumble flow in the same direction as the swirl flow and flow into the cylinder, the tumble flow generating part including a helical part having an inner wall surface curving around a centerline perpendicular to an opening surface of the second intake port and continuing from a first intake port side to an opposite side from the first intake port at the opening of the second intake port, and
wherein the second intake port has an edge part of the opening thereof, the edge part having an opening angle with respect to the centerline of the second intake port, the opening angle being smaller at an upstream side of the swirl flow than at a downstream side of the swirl flow.

2. The cylinder head of claim 1, wherein the second intake port includes a curved part, provided upstream of the helical part, curved to be convex in a direction away from the first intake port so that intake air is guided to flow toward the inner wall surface of the helical part on the first intake port side.

3. The cylinder head of claim 1, wherein the edge part of the opening of the second intake port is a second edge part and the opening angle of the second edge part is a second opening angle, and
wherein the first intake port has a first edge part of the opening thereof, the first edge part having a first opening angle with respect to the centerline of the first intake port, the first opening angle being larger at a side to which the intake air flows to generate the swirl flow than at a side across the opening of the first intake port.

4. The cylinder head of claim 1, wherein the first intake port and the second intake port are formed by branching one common port that opens to a side surface of the cylinder head into two parts, and extending to the cylinder.

5. The cylinder head of claim 2,
wherein the edge part of the opening of the second intake port is a second edge part and the opening angle of the second edge part is a second opening angle, and wherein the first intake port has a first edge part of the opening thereof, the first edge part having a first opening angle with respect to the centerline of the first intake port, the first opening angle being larger at a side to which the intake air flows to generate the swirl flow than at a side across the opening of the first intake port.

6. The cylinder head of claim 2, wherein the first intake port and the second intake port are formed by branching one common port that opens to a side surface of the cylinder head into two parts, and extending to the cylinder.

7. The cylinder head of claim 3, wherein the first intake port and the second intake port are formed by branching one common port that opens to a side surface of the cylinder head into two parts, and extending to the cylinder.

* * * * *